Figure 1:
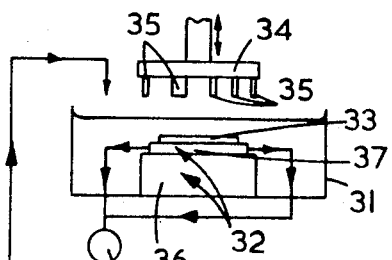

United States Patent [19]
Hall et al.

[11] 3,739,138
[45] June 12, 1973

[54] SPARK EROSION MACHINING

[75] Inventors: Bernard Arthur Hall, Birmingham; Stanley Peter Hollins, Streetly, both of England

[73] Assignee: Joseph Lucas (Industries) Limited, Birmingham, England

[22] Filed: June 29, 1972

[21] Appl. No.: 267,594

[30] Foreign Application Priority Data
Feb. 7, 1971 Canada .................................. 31081

[52] U.S. Cl. .............................................. 219/69 D
[51] Int. Cl. ............................................... B23p 1/08
[58] Field of Search .......................... 219/69 D, 69 E

[56] References Cited
UNITED STATES PATENTS
2,908,797  10/1959  Stegler ........................ 219/69 D X
3,144,542   8/1964  Haas et al. ...................... 219/69 D
3,454,737   7/1969  Pfau et al. ....................... 219/69 D
3,513,282   5/1970  Fox .................................. 219/69 E Primary Examiner—R. F. Staubly
Attorney—John C. Holman and Marvin R. Stern

[57] ABSTRACT

Apparatus for use in spark erosion machining a plurality of through bores in a work piece. The apparatus includes a work piece support and an electrode support which is movable relatively towards and away from the workpiece support. The workpiece support defines a recess which in use is closed by the work piece so that the work piece and support define a chamber which is open by way of the bores being machined in the work piece. The work piece support contains a conduit extending around the recess and communicating with the recess by way of a plurality of passages which are spaced around the wall of the recess and the apparatus also includes a pump and means coupling the pump to the conduit so that during operation of the pump a pressure difference exists between opposite sides of the work piece so that dielectric liquid is caused to flow through the bores which are being machined in the work piece. The apparatus further includes detachable plugs for blocking predetermined passages of said plurality of passages so as to provide different pressure differences between opposite sides of the work piece in selected regions of the work piece.

5 Claims, 5 Drawing Figures

PATENTED JUN 12 1973

3,739,138

SPARK EROSION MACHINING

This invention relates to apparatus for spark erosion machining a plurality of through bores in a workpiece.

Apparatus according to the invention includes a workpiece support and an electrode support movable relative to the workpiece support, the workpiece support having therein a recess which is closed in use by the workpiece so that the workpiece and support define a chamber open by way of the bores being machined in the workpiece, the support further having therein a conduit which extends around the recess and which communicates with said recess by way of a plurality of passages spaced around the wall of the recess, the apparatus further including a pump for pumping dielectric liquid, means coupling the pump to said conduit so that during operation of the pump there exists a pressure difference between opposite sides of the workpiece whereby dielectric liquid is caused to flow through the bores being machined in the workpiece, and, means for blocking predetermined passages of said plurality of passages so as to provide different pressure differences between opposite sides of the workpiece in selected regions of the workpiece.

Conveniently the apparatus includes a reservoir of dielectric liquid and the workpiece support and in use the workpiece are immersed in dielectric liquid in the reservoir, said pump, in use, drawing dielectric liquid from the reservoir through the bores being machined in the workpiece, said chamber, the unblocked passages of said plurality of passages, and said conduit.

Desirably said means for blocking predetermined passages of said plurality of passages includes a plurality of plugs engageable in respective passages.

Figure 3:
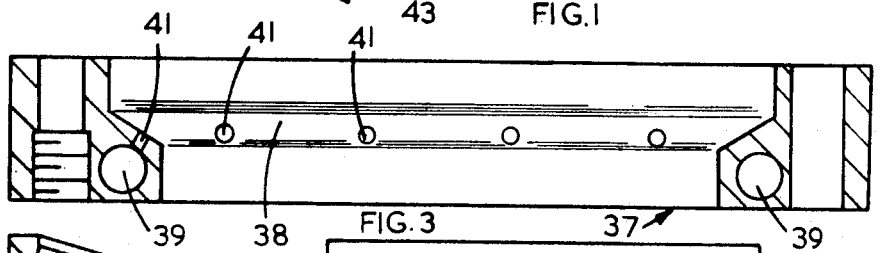
Figure 4:
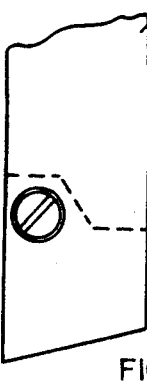
Figure 5:
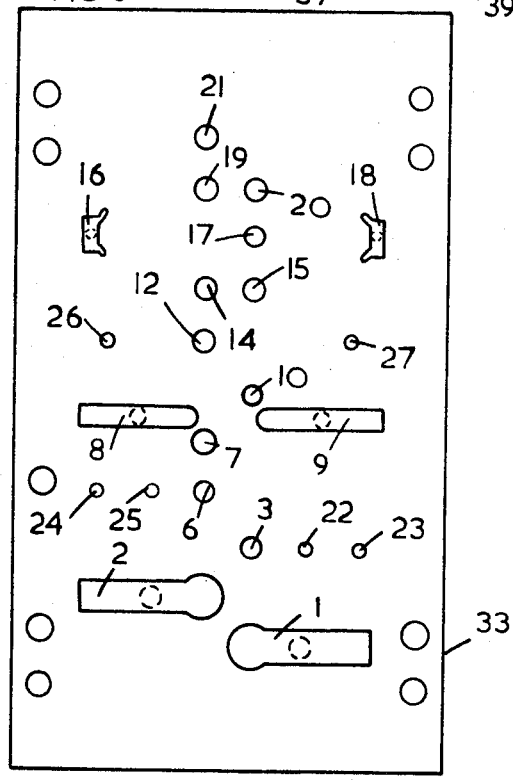
Figure 2:
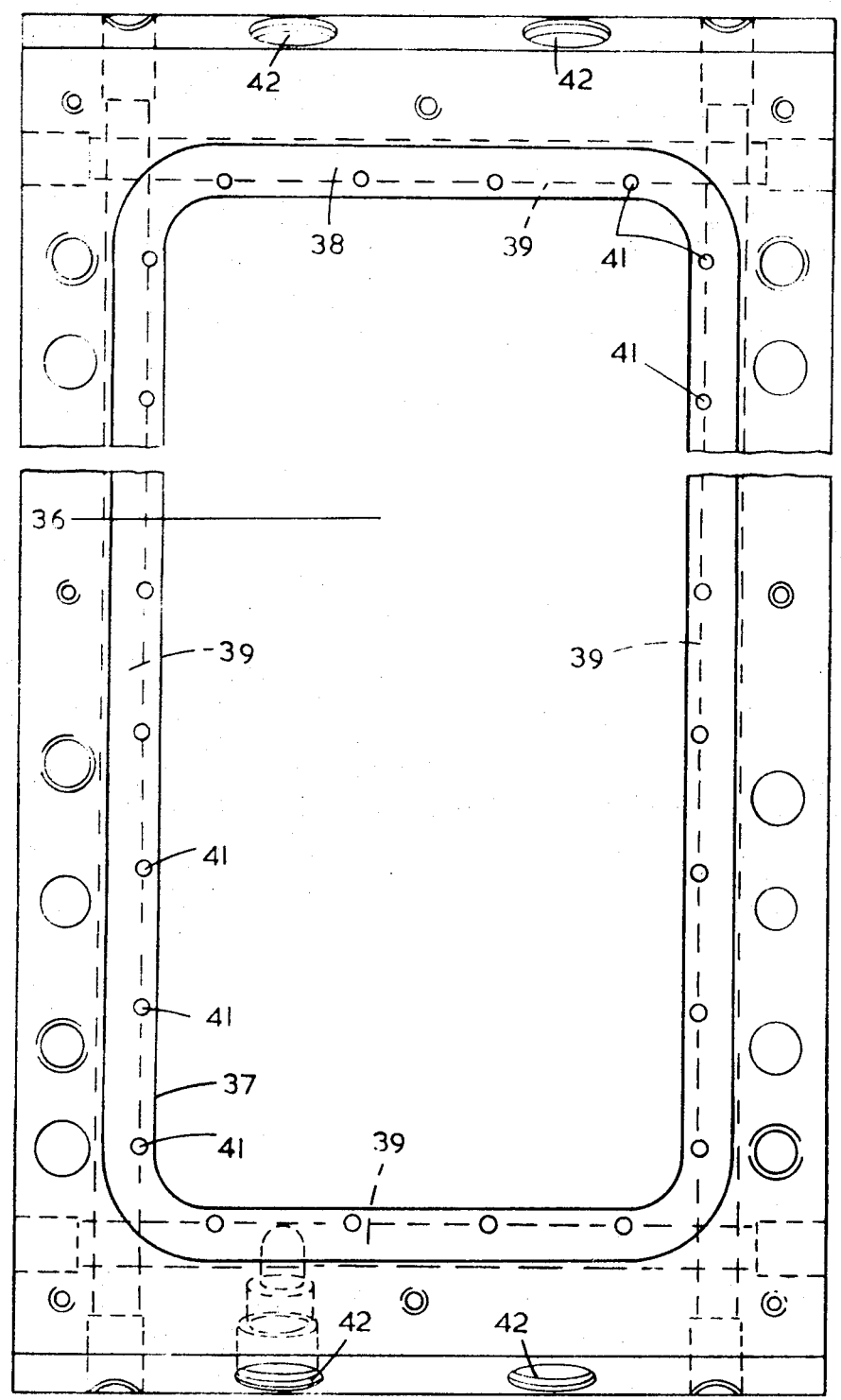

One example of the invention is illustrated in the accompanying drawings wherein FIG. 1 is a diagrammatic representation of spark erosion apparatus for machining a plurality of through bores in a workpiece FIG. 2 is a plan view of a workpiece support shown in FIG. 1, FIGS. 3 and 4 are sectional and part sectional views of the support shown in FIG. 2, and FIG. 5 is a plan view of an example of a workpiece machined by the apparatus shown in FIGS. 1 to 4.

Referring to the drawings, the spark erosion apparatus includes a reservoir 31 of dielectric liquid conveniently high flash point paraffin oil, and housed within the reservoir 31 so as to be normally totally immersed in the dielectric liquid is a workpiece support 32. A workpiece 33 carried by the support 32 is presented towards the surface of the dielectric liquid, and movable towards and away from the support 32 is an electrode support 34 carrying a plurality of graphite electrodes 35.

The workpiece support 32 comprises a platform 36 having mounted thereon a rectangular, annular component 37. The inner periphery of the component 37 includes an inclined shoulder 38 facing generally away from the platform 36. Within the thicker portion of the component 37 between the platform 36 and the shoulder is a is conduit 39 which extends around the inner periphery of the component 37. Communicating with the conduit 39 are a plurality of passages 41 which open at their ends remote from the conduit 39 onto the shoulder 38. The component 37 is provided with a number of mounting holes for receiving bolts which in use secure the component 37 to the platform 36. Moreover, the face of the component 37 remote from the platform 36 in use is apertured to receive screws for securing the plate like workpiece 33 to the support 32. The workpiece 33 closes the recess defined by the component 37 in the workpiece support 32, so as to define a chamber with which the conduit 39 communicates by way of the passages 41. The conduit 39 further communicates with a number of pipe unions 42 which receive pipes coupling the conduit 39 to the inlet of a suction pump 43. The pump 43 discharges back into the reservoir 31, and so dielectric liquid drawn into the pump 33 is returned to the reservoir 31.

The workpiece 33 shown in FIG. 5 has a plurality of through bores, of which only the bores numbered 1, 2, 8, 9, 16, and 18 are formed by the spark erosion process. The remaining holes are produced by a conventional jig boring, or drilling process after the formation of the holes 1, 2, 8, 9, 16 and 18 by the spark erosion technique. However, when the blank of the workpiece 33 is positioned in the spark erosion apparatus prior to the formation of the apertures 1, 2, 8, 9, 16 and 18 the blank has already been provided with a pilot bore associated with each of the apertures 1, 2, 8, 9, 16 and 18, the pilot bores being indicated in FIG. 5 in dotted lines, and extending completely through the workpiece. Thus as the pump 33 begins to operate then dielectric liquid is drawn through the pilot bores of the workpiece 33 for the chamber defined within the workpiece support 32, through the bores 41, and the conduit 39. Moreover, as the spark erosion technique proceeds and the apertures 1, 2, 8, 9, 16 and 18 corresponding in shape to their respective electrodes 35 are formed, dielectric liquid is drawn between each electrode and the wall of the respective aperture which is being formed, so that the detrius of the machining operation is carried from the area which is being machined adjacent each electrode by the flow of dielectric liquid.

It is known that the rate of flow of dielectric liquid through the spark gap between the electrode and the workpiece influences the nature of the form machined on the workpiece. For example, the rate of flow can effect the surface finish produced on the machined areas of the workpiece, and in addition when machining a through bore, the rate of flow can determine whether or not the bore tapers. When the pump 33 is operating, then assuming that all of the passages 41 are open the pressure difference between opposite sides of the workpiece 33 will be substantially equal for all regions of the workpiece, since the passages 41 are substantially equi-angularly spaced around the periphery of the workpiece. However, the apertures 1, 2, 8, 9, 16 and 18 are of three different shapes and sizes, and so the rate of flow of dielectric liquid through the apertures 8 and 9 in use will not be the same as, for example, the rate of flow of dielectric liquid through the apertures 1 and 2, and so the finished nature of the apertures 1 and 2 may not be the same as the finished nature of the bores 8 and 9, even though they are machined in the same operation.

In order to minimize this problem moulded nylon plugs are provided for the passages 41. When passages 41 adjacent a given region of the workpiece are blocked by respective nylon plugs, then the pressure difference across that region of the workpiece 33 will be less than the pressure difference across those regions of the workpiece where the passages 41 are not plugged. Thus by selectively plugging the passages 41 of the component 37 the rates of flow of dielectric liquid through apertures in various regions of the plate can be controlled in a manner to give desired results. It is conceivable that the holes to be plugged for a given workpiece could be calculated mathematically from the characteristics of the apertures to be produced in the workpiece, although clearly, the apertures to be plugged can also be determined by trial and error.

It will be appreciated, that in addition to plugging passages 41 to ensure that different apertures in a common workpiece have similar characteristics, the apertures could be plugged in such a manner that similarly sized and shaped apertures in a common workpiece could have different surface, or taper characteristics.

We claim:

1. Apparatus for spark erosion machining a plurality of through bores in a workpiece, including a workpiece support and an electrode support movable relative to the workpiece support, the workpiece support having therein a recess which is closed in use by the workpiece so that the workpiece and support define a chamber open by way of the bores being machined in the workpiece, the support further having therein a conduit which extends around the recess and which communicates with said recess by way of a plurality of passages spaced around the wall of the recess, the apparatus further including a pump for pumping dielectric liquid, means coupling the pump to said conduit so that during operation of the pump there exists a pressure difference between opposite sides of the workpiece whereby dielectric liquid is caused to flow through the bores being machined in the workpiece, and, means for blocking predetermined passages of said plurality of passages so as to provide different pressure differences between opposite sides of the workpiece in selected regions of the workpiece.

2. Apparatus as claimed in claim 1 further including a reservoir of dielectric liquid and the workpiece support and in use the workpiece are immersed in dielectric liquid in the reservoir, said pump, in use, drawing dielectric liquid from the reservoir through the bores being machined in the workpiece, said chamber, the unblocked passages of said plurality of passages, and said conduit.

3. Apparatus as claimed in claim 1 wherein said means for blocking predetermined passages of said plurality of passages includes a plurality of plugs engageable in respective passages.

4. A method of spark erosion machining a plurality of through bores in a workpiece utilizing apparatus as claimed in claim 1.

5. A workpiece having a plurality of through bores formed therein by the method claimed in claim 4.

* * * * *